US012598553B2

(12) United States Patent
Vikram et al.

(10) Patent No.: US 12,598,553 B2
(45) Date of Patent: Apr. 7, 2026

(54) INTELLIGENT POWER SAVING IN A WIRELESS COMMUNICATION SYSTEM

(71) Applicant: Apple Inc., Cupertino, CA (US)

(72) Inventors: Sushant Vikram, San Diego, CA (US); Shadi Iskander, Ergolding (DE); Farhan Aziz, San Diego, CA (US); Syed Hussein Ali, San Jose, CA (US); Tamer Adel Darweesh Hassan Darweesh, Munich (DE); Pradeep S. Sharma, Cupertino, CA (US); Ammar Tahir, San Diego, CA (US); Ajay Singh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 513 days.

(21) Appl. No.: 17/890,882

(22) Filed: Aug. 18, 2022

(65) Prior Publication Data

US 2024/0064645 A1 Feb. 22, 2024

(51) Int. Cl.
*H04W 24/10* (2009.01)
*H04W 4/02* (2018.01)
*H04W 52/02* (2009.01)

(52) U.S. Cl.
CPC ......... *H04W 52/0254* (2013.01); *H04W 4/02* (2013.01); *H04W 52/0212* (2013.01)

(58) Field of Classification Search
CPC ..... H04W 24/02; H04W 24/08; H04W 24/10; H04W 4/02; H04W 52/0212; H04W 52/0254
See application file for complete search history.

(56) References Cited

U.S. PATENT DOCUMENTS

| | | | | | |
|---|---|---|---|---|---|
| 5,870,685 | A | * | 2/1999 | Flynn | H02J 7/007182 |
| | | | | | 340/7.37 |
| 8,489,111 | B2 | * | 7/2013 | Chawla | G01S 5/019 |
| | | | | | 455/456.3 |

(Continued)

FOREIGN PATENT DOCUMENTS

| | | |
|---|---|---|
| EP | 0812119 A2 | 12/1997 |
| WO | WO 2021020952 A1 | 2/2021 |

OTHER PUBLICATIONS

International Search Report and the Written Opinion of the International Searching Authority, directed to related International Patent Application No. PCT/US2023/072501, mailed Apr. 12, 2024; 12 pages.
3GPP TS 36.133 V17.6.0 (Jun. 2022), 3rd Generation Partnership Project; Technical Specification Group Radio Access Network; Evolved Universal Terrestrial Radio Access (E-UTRA); Requirements for support of radio resource management (Release 17); 4005 pages.

(Continued)

*Primary Examiner* — Phuc H Tran
(74) *Attorney, Agent, or Firm* — Sterne, Kessler, Goldstein & Fox P.L.L.C.

(57) ABSTRACT

Some aspects relate to apparatuses and methods for implementing mechanisms for intelligent power saving in a wireless communication system. For example, a user equipment (UE) is configured to determine whether a movement state associated with the UE satisfies one or more movement conditions. The UE can further determine operational information associated with the UE, in response to the determination that the movement state associated with the UE satisfies the one or more movement conditions. The operational information can include location information, power level information, or background process information. The UE can further cease, at least based on the operational information and one or more operational conditions being satisfied, a signal measurement associated with a neighbor cell.

14 Claims, 5 Drawing Sheets

(56) References Cited

U.S. PATENT DOCUMENTS

| | | | | |
|---|---|---|---|---|
| 10,034,144 | B2 * | 7/2018 | Agarwal | H04L 67/12 |
| 2002/0132653 | A1 * | 9/2002 | Okamoto | G06F 1/324 |
| | | | | 455/574 |
| 2003/0119504 | A1 * | 6/2003 | Rankin | H04W 36/24 |
| | | | | 455/574 |
| 2004/0176146 | A1 * | 9/2004 | Kim | H04W 52/0296 |
| | | | | 455/572 |
| 2006/0099998 | A1 * | 5/2006 | Kang | H04B 1/1615 |
| | | | | 455/343.1 |
| 2007/0123265 | A1 * | 5/2007 | Moon | H04W 36/24 |
| | | | | 455/574 |
| 2011/0111768 | A1 * | 5/2011 | Ge | H04W 60/04 |
| | | | | 455/456.1 |
| 2013/0084892 | A1 * | 4/2013 | Teyeb | H04W 48/16 |
| | | | | 455/456.6 |
| 2018/0332532 | A1 * | 11/2018 | Johansson | H04W 24/02 |
| 2022/0174608 | A1 * | 6/2022 | Laselva | H04W 24/08 |
| 2022/0279445 | A1 | 9/2022 | Shrivastava et al. | |
| 2022/0394532 | A1 * | 12/2022 | Thangarasa | H04W 52/0209 |

OTHER PUBLICATIONS

3GPP TS 36.331 V17.1.0 (Jun. 2022), 3rd Generation Partnership Project; Technical Specification Group Radio Access Network; Evolved Universal Terrestrial Radio Access (E-UTRA); Radio Resource Control (RRC); Protocol specification (Release 17); 1128 pages.

3GPP TS 38.133 V17.6.0 (Jun. 2022), 3rd Generation Partnership Project; Technical Specification Group Radio Access Network; NR; Requirements for support of radio resource management (Release 17); 3637 pages.

3GPP TS 38.304 V17.1.0 (Jun. 2022), 3rd Generation Partnership Project; Technical Specification Group Radio Access Network; NR; User Equipment (UE) procedures in Idle mode and RRC Inactive state (Release 17); 50 pages.

3GPP TS 38.331 V17.1.0 (Jun. 2022), 3rd Generation Partnership Project; Technical Specification Group Radio Access Network; NR; Radio Resource Control (RRC) protocol specification (Release 17); 1273 pages.

* cited by examiner

300

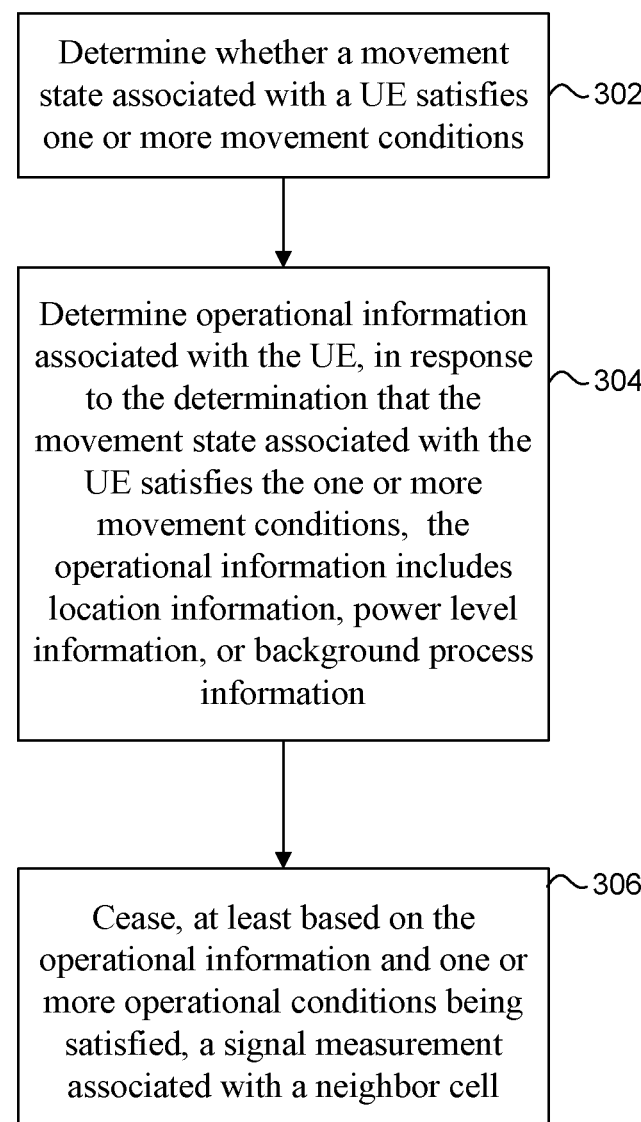

Determine whether a movement state associated with a UE satisfies one or more movement conditions ~302

Determine operational information associated with the UE, in response to the determination that the movement state associated with the UE satisfies the one or more movement conditions, the operational information includes location information, power level information, or background process information ~304

Cease, at least based on the operational information and one or more operational conditions being satisfied, a signal measurement associated with a neighbor cell ~306

*FIG. 3*

INTELLIGENT POWER SAVING IN A WIRELESS COMMUNICATION SYSTEM

BACKGROUND

Field

The described aspects generally relate to wireless communication systems, including one or more methods and apparatuses for intelligent power saving operations in a wireless communication system.

Related Art

A wireless communication system can include a fifth generation (5G) system, a New Radio (NR) system, a long term evolution (LTE) system, a combination thereof, or some other wireless systems. With the tremendous growth in the number of connected devices and the rapid increase in user/network traffic volume, various efforts have been made to improve different aspects of wireless communication for the wireless communication systems by improving data rate, latency, reliability, and mobility.

However, as the demand for radio access continues to increase, there is a need for further improvements in wireless communication for the wireless communication systems.

SUMMARY

Some aspects of this disclosure relate to apparatuses and methods for implementing techniques for performing intelligent power saving operations in a wireless communication system. The implemented techniques can be applicable to many wireless systems, e.g., a wireless communication system based on one or more 3 GPP standards.

Some aspects of this disclosure relate to a user equipment (UE). A UE can include a transceiver configured to wirelessly communicate with a cell in a wireless network, and a processor communicatively coupled to the transceiver. The processor can be configured to determine whether a movement state associated with the UE satisfies one or more movement conditions. The processor can be configured to determine operational information associated with the UE, in response to the determination that the movement state associated with the UE satisfies the one or more movement conditions. The operational information can include location information, power level information, or background process information. The processor can be configured to cease, at least based on the operational information and one or more operational conditions being satisfied, a signal measurement associated with a neighbor cell.

According to some aspects, the UE can be in a RRC_CONNECTED state or a RRC_IDLE state or a RRC_Inactive state.

According to some aspects, the one or more movement conditions associated with the UE can include a movement state of at least substantially stationary.

According to some aspects, the signal measurement can include an inter-frequency measurement or an inter-Radio Access Technology (inter-RAT) measurement.

According to some aspects, the location information can be determined by location fingerprinting and the operational information associated with the UE can include movement information.

According to some aspects, the signal measurement associated with the neighbor cell can be associated with a cell reselection procedure.

According to some aspects, the processor can be configured to cease, at least based on the operational information and one or more operational conditions being satisfied, the signal measurement associated with the neighbor cell based on a location associated with the UE being one of a plurality of predetermined locations; or a power level of the UE being below a predetermined threshold; or a background sync for an application or a background PLMN search being determined.

According to some aspects, the processor can be further configured to cease, at least based on the operational information and one or more operational conditions being satisfied, the signal measurement associated with the neighbor cell based on a search for a higher priority frequencies being determined.

According to some aspects, the processor can be further configured to restart or continue performing the signal measurement associated with the neighbor cell when the movement associated with the UE is above a predetermined threshold; or restart or continue performing the signal measurement associated with the neighbor cell when the cell is determined to be congested; or restart or continue performing the signal measurement associated with the neighbor cell when the cell is determined to be barred; or restart or continue performing the signal measurement associated with the neighbor cell when a change in dedicated priority or deprioritization of cell is determined.

Some aspects of this disclosure relate to a method including determining whether a movement state associated with the UE satisfies one or more movement conditions. The method also includes determining operational information associated with the UE, in response to the determination that the movement state associated with the UE satisfies the one or more movement conditions. The operational information can include location information, power level information, or background process information. The method further includes ceasing, at least based on the operational information and one or more operational conditions being satisfied, a signal measurement associated with a neighbor cell.

According to some aspects, the UE can be in a RRC_CONNECTED state or a RRC_IDLE state or a RRC_Inactive state.

According to some aspects, the one or more movement conditions associated with the UE can include a movement state of at least substantially stationary.

According to some aspects, the signal measurement can include an inter-frequency measurement or an inter-Radio Access Technology (inter-RAT) measurement.

According to some aspects, the location information can be determined by location fingerprinting and the operational information associated with the UE can include movement information.

According to some aspects, the signal measurement associated with the neighbor cell can be associated with a cell reselection procedure.

According to some aspects, the ceasing, at least based on the operational information, the signal measurement associated with the neighbor cell can include ceasing the signal measurement associated with the neighbor cell when a location associated with the UE is one of a plurality of predetermined locations; or ceasing the signal measurement associated with the neighbor cell when a power level of the UE is below a predetermined threshold; or ceasing the signal measurement associated with the neighbor cell when a background sync for an application or a background PLMN search is determined.

According to some aspects, the method can further include ceasing the signal measurement associated with the neighbor cell a search for higher priority frequencies is determined.

According to some aspects, the method can further include restarting or continuing performing the signal measurement associated with the neighbor cell when the movement associated with the UE is above a predetermined threshold; or restarting or continuing performing the signal measurement associated with the neighbor cell when the cell is determined to be congested; or restarting or continuing performing the signal measurement associated with the neighbor cell when the cell is determined to be barred; or restarting or continuing performing the signal measurement associated with the neighbor cell when a change in dedicated priority or deprioritization of cell is determined.

Some aspects of this disclosure relate to a non-transitory computer-readable medium storing instructions. When the instructions are executed by a processor of a base station, the instructions cause the processor to perform operations including determining whether a movement state associated with the UE satisfies one or more movement conditions. The operations also include determining operational information associated with the UE, in response to the determination that the movement state associated with the UE satisfies the one or more movement conditions. The operational information can include location information, power level information, or background process information. The operations further include ceasing, at least based on the operational information and one or more operational conditions being satisfied, a signal measurement associated with a neighbor cell.

According to some aspects, the UE can be in a RRC_CONNECTED state or a RRC_IDLE state or a RRC_Inactive state.

According to some aspects, the one or more movement conditions associated with the UE can include a movement state of at least substantially stationary.

According to some aspects, the signal measurement can include an inter-frequency measurement or an inter-Radio Access Technology (inter-RAT) measurement.

According to some aspects, the location information can be determined by location fingerprinting and the operational information associated with the UE can include movement information.

According to some aspects, the signal measurement associated with the neighbor cell can be associated with a cell reselection procedure.

According to some aspects, the operation of ceasing, at least based on the operational information and one or more operational conditions being satisfied, the signal measurement associated with the neighbor cell can include ceasing the signal measurement associated with the neighbor cell when a location associated with the UE is one of a plurality of predetermined locations; or ceasing the signal measurement associated with the neighbor cell when a power level of the UE is below a predetermined threshold; or ceasing the signal measurement associated with the neighbor cell when a background sync for an application or a background PLMN search is determined.

According to some aspects, the operation of ceasing, at least based on the operational information and one or more operational conditions being satisfied, the signal measurement associated with the neighbor cell can further include ceasing the signal measurement associated with the neighbor cell when a search for a higher priority frequencies is determined.

According to some aspects, the operations can further include restarting or continuing performing the signal measurement associated with the neighbor cell when the movement associated with the UE is above a predetermined threshold; or restarting or continuing performing the signal measurement associated with the neighbor cell when the cell is determined to be congested; or restarting or continuing performing the signal measurement associated with the neighbor cell when the cell is determined to be barred; or restarting or continuing performing the signal measurement associated with the neighbor cell when a change in dedicated priority or deprioritization of cell is determined.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 3 illustrates an example method for a system (for example, a user equipment [UE]) for performing intelligent power saving operations, according to some aspects of the disclosure.

Figure 1:
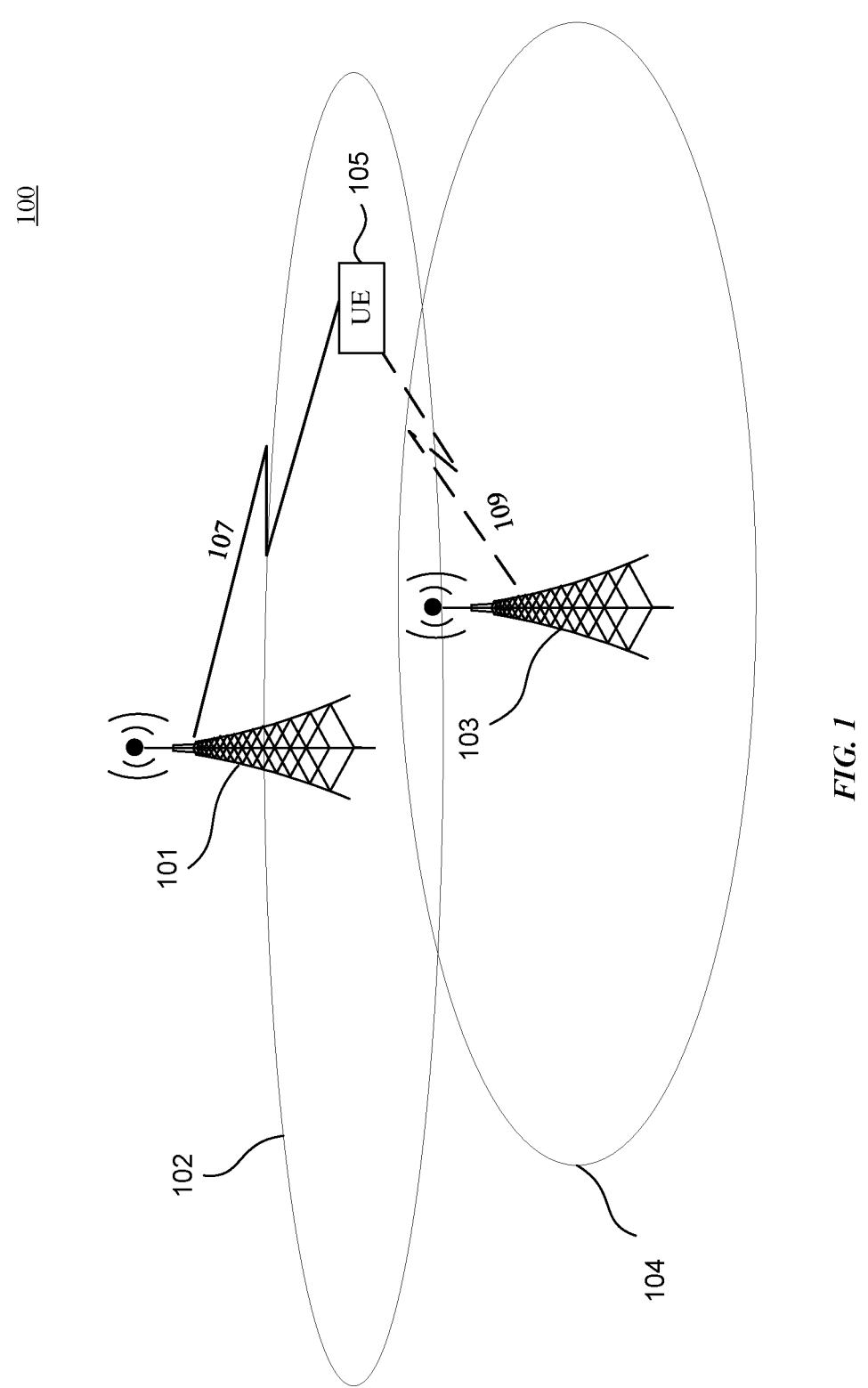
FIG. 1 illustrates an example system implementing mechanisms for performing intelligent power saving operations at a wireless communication system, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure relate to apparatuses and methods for implementing techniques for performing intelligent power saving operations of a wireless communication system. The implemented techniques can be applicable to many wireless systems, e.g., a wireless communication system based on one or more 3GPP standards, as described in for example, 3GPP TS 38.331 3GPP 38.133, 3GPP 38.304, 3GPP 36.133, 3GPP 36.331 or others.

A wireless communication system can include a fifth generation (5G) system, a New Radio (NR) system, a long term evolution (LTE) system, a combination thereof, or some other wireless systems. A wireless communication system (e.g., UE), can perform a cell search and reselection procedure based on various parameters. A cell reselection procedure may ensure that the UE can camp on or connect to the best cell in terms of radio condition, e.g., in terms of path loss or RSRP metric. The UE may perform intra frequency cell reselection or inter frequency cell reselection in a different frequency band. The UE may conduct some measurements, such as Inter-frequency or Inter-Radio Access Technology (RAT) measurements to support cell reselection procedures, which can impact power consumption of the UE.

In some aspects, power consumption may be a concern for a UE, depending on the UE, the availability of power may vary. For example, a UE may be a low-power, wireless device and/or may be more power-sensitive than another type of UE. In another example, the battery life of the UE may need to be increased. In this regard, current approaches regarding cell reselection may not yield the best results for UEs to increase battery life.

Some aspects of this disclosure provide mechanisms for intelligent power saving operations of a wireless communication system.

FIG. 1 illustrates an example system implementing mechanisms for performing intelligent power saving operations at a wireless communication system, according to some aspects of the disclosure. Example system 100 is provided for the purpose of illustration only and does not limit the disclosed aspects.

Wireless network 100 includes, but is not limited to, network nodes (for example, base stations such as evolved node B [eNB]s, next generation node B [gNB]s) 101 and 103 and electronic device (for example, a UE) 105. There can be other network entities, e.g., network controller, a relay station, not shown. Electronic device 105 (hereinafter referred to as UE 105) can include an electronic device configured to operate based on a wide variety of wireless communication techniques. These techniques can include, but are not limited to, techniques based on 3rd Generation Partnership Project (3GPP) standards. For example, UE 105 can include an electronic device configured to operate based on one or more 3GPP standards, as described in for example, 3GPP TS 38.331 3GPP 38.133, 3GPP 38.304, 3GPP 36.133, 3GPP 36.331 or others. UE 105 can include, but is not limited to: wireless communication devices, smart phones, laptops, desktops, tablets, personal assistants, monitors, televisions, wearable devices, Internet of Things (IoTs), vehicle's communication devices, and the like. Network nodes 101 and 103 (herein referred to as base stations) and associated cell 102 and cell 104, can include nodes configured to operate based on a wide variety of wireless communication techniques such as, but not limited to, techniques based on 3GPP standards. For example, base stations 101 and 103 can include nodes configured to operate based on one or more 3GPP standards, as described in for example, 3GPP TS 38.331 3GPP 38.133, 3GPP 38.304, 3GPP 36.133, 3GPP 36.331 or others.

According to some aspects, UE 105 is configured to implement mechanisms for performing intelligent power saving operations as described herein.

In some aspects, UE 105 can be configured to determine whether a movement state associated with UE 105 is in a predefined condition. UE 105 can be configured to determine the movement state by movement information (e.g., speed, acceleration, etc.) of UE 105 using one or more positional and/or motion sensors (e.g., GPS, accelerometer, gyroscope sensor, etc.) and/or one or more positional determinations (e.g., location fingerprinting) using signal characteristics relative to one or more base stations and/or access points. In one example, UE 105 can be configured to determine the movement state is stationary or substantially stationary for a predefined time period. In another example, UE 105 can be configured to determine the movement state indicates the UE is moving below a predetermined speed, a predetermined distance, or a predetermined time period. For example, UE 105 can be configured to determine the movement state indicates the UE is moving below a pedestrian or vehicular speed, a short distance, or a short time period.

In some aspects, UE 105 can be configured to determine operational information associated with UE 105, including, but not limited to, location information, movement information, power level information, or application information. In some aspects, UE 105 can be configured to determine location information, movement information from one or more positional and/or motion sensors (e.g., GPS, accelerometer, gyroscope sensor, etc.) and/or one or more positional determinations (e.g., location fingerprinting) using signal characteristics relative to one or more base stations and/or access points. For example, UE 105 can be configured to determine a fingerprinted location associated with UE 105 to be, for example, home or office associated with a user of UE 105, based on the location information. UE 105 can be configured to determine a high priority search in cell selection and reselection in a fingerprinted location. UE 105 can be configured to determine a movement associated with UE 105 to be within a predefined limit, based on the movement information.

In some aspects, UE 105 can be configured to determine power level information to determine a power mode and/or power level of a battery associated with UE 105. In some aspects, UE 105 can be configured to determine background process information. For example, UE 105 can be configured to determine background sync processes for an application, such as an email or calendar application, and/or background public land mobile network (PLMN) searches.

In some aspects, UE 105 can be configured to perform one or more signal measurements to measure the serving cell and neighbor cell signal strength or signal quality matrix i.e. Reference Signal Received Power (RSRP), Reference Signal Received Quality (RSRQ). In some aspects, UE 105 can be configured to measure the serving cell power level by, for example, measuring RSRP. In some aspects, when camped on a cell (e.g., cell 102), UE 105 can be configured to regularly search for a better cell according to a cell reselection criteria. If a better cell is found, that cell (e.g., a neighbor cell 104) can be selected. The change of cell may imply a change of RAT. In some aspects, cell reselection to a cell on a higher priority NR frequency or inter-RAT frequency than the serving frequency can be performed. According to some aspects, UE 105 can be configured to perform measurements such as Inter-frequency and/or Inter-RAT measurements to support cell selection and reselection procedures. For example, when in idle mode, UE 105 can be configured to measure the signal strength and/or quality (e.g., RSRP, RSRQ) of a serving cell at least every discontinuous reception (DRX) cycle. UE 105 can be configured to select a set of measurement entities based on selection rules that are configured. In some aspects, UE 105 can be configured to perform inter-frequency measurements based on various conditions, such as every DRX cycle, after reselection of another cell, etc.

In some aspects, UE 105 can be configured to determine operational information associated with a cell (e.g., serving cell 101), including, but not limited to, power level information, or system information. UE 105 can be configured to determine, by performing one or more signal measurements, if a power level of a serving cell (e.g., cell 101) fluctuating within a predefined limit. In some aspects, UE 105 can be configured to determine one or more status such as cell barred, and/or a change in dedicated priority or deprioritization of the serving cell based on system information associated with the serving cell. However, the aspects of this disclosure are not limited to these examples. In some aspects, UE 105 can be configured to determine one or more status such as cell congested.

In some aspects, as described in 3GPP 38.304, absolute priorities of different NR frequencies or inter-RAT frequencies may be provided to UE 105 in the system information, in the RRCRelease message, or by inheriting from another RAT at inter-RAT cell (re)selection. If UE 105 is in camped on any cell state, UE 105 shall only apply the priorities provided by system information from current cell, and UE 105 preserves priorities provided by dedicated signalling and deprioritisationReq received in RRCRelease unless specified otherwise. When UE 105 is in camped normally state, and UE 105 is provided with only dedicated priorities other than for the current frequency, UE 105 shall consider the current frequency to be the lowest priority frequency (i.e. lower than any of the network configured values). UE 105 shall only perform cell reselection evaluation for NR frequencies and inter-RAT frequencies that are given in system information and for which UE 105 has a priority provided.

Figure 2:
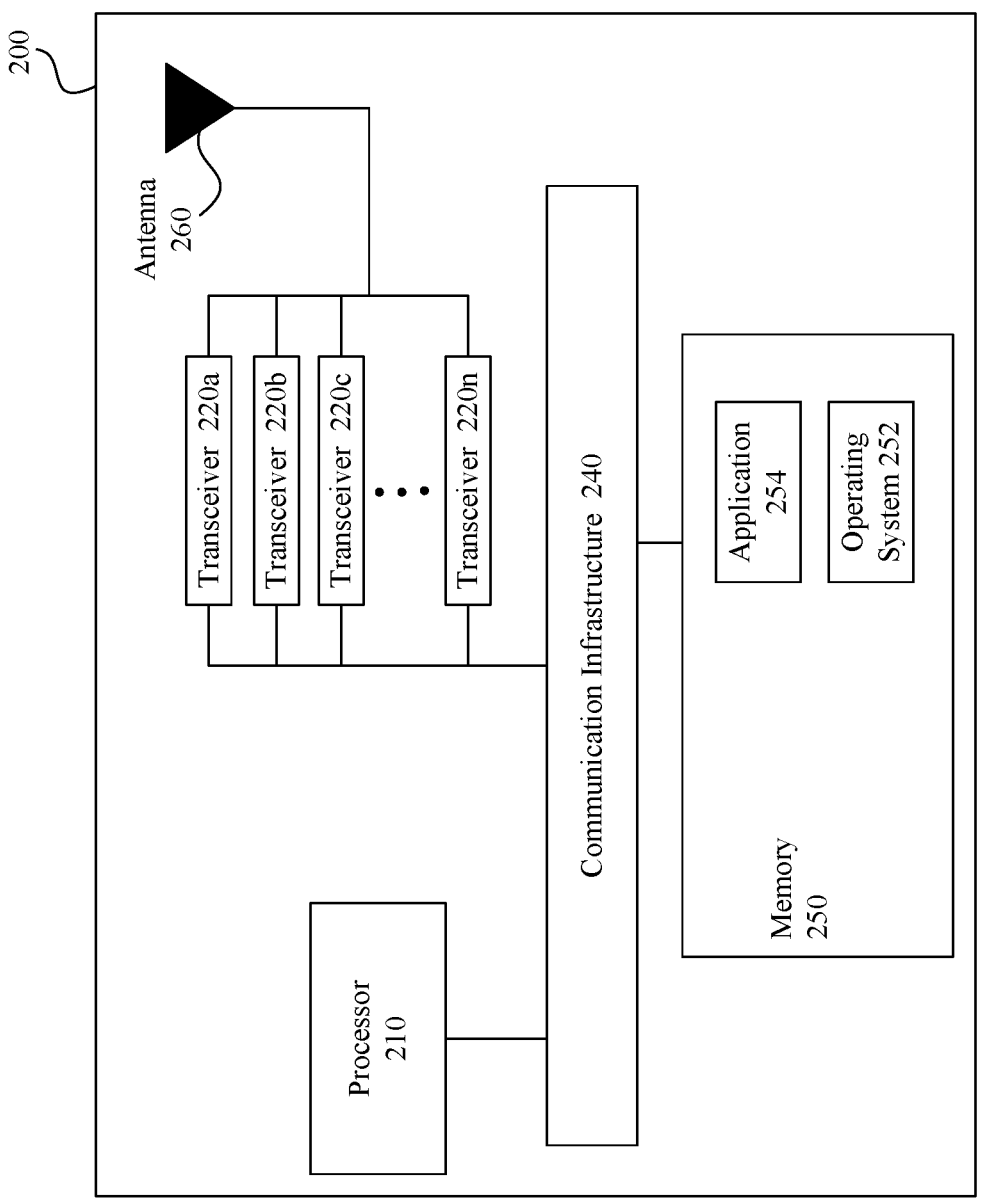
FIG. 2 illustrates a block diagram of an example system of an electronic device implementing mechanisms for performing intelligent power saving operations at a wireless communication system, according to some aspects of the disclosure.

FIG. 2 illustrates a block diagram of an example system of an electronic device implementing mechanisms for performing intelligent power saving operations at a wireless communication system, according to some aspects of the disclosure. System 200 may be any of the electronic devices (e.g., base stations 101, 103, UE 105) of wireless network 100. System 200 includes processor 210, one or more transceivers 220a-220n, communication infrastructure 240, memory 250, operating system 252, application 254, and antenna 260. Illustrated systems are provided as exemplary parts of system 200, and system 200 can include other circuit(s) and subsystem(s) as will be understood by those skilled in art. Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220a-220n. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanisms and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to radio streaming, video streaming, remote control, email, calendar and/or other user applications.

System 200 can also include communication infrastructure 240. Communication infrastructure 240 provides communication between, for example, processor 210, one or more transceivers 220a-220n, and memory 250. In some implementations, communication infrastructure 240 may be a bus. In embodiments, processor 210 together with instructions stored in memory 250 performs operations enabling system 200 to implement mechanisms for performing intelligent power saving operations, as described herein. In embodiments, processor 210 is "hard'-wired" or "hard-coded" to implement mechanisms for performing intelligent power saving operations, as described herein.

One or more transceivers 220a-220n transmit and receive communications signals that support mechanisms for performing intelligent power saving operations at a wireless communication system, according to some aspects, and may be coupled to antenna 260. Antenna 260 may include one or more antennas that may be the same or different types. One or more transceivers 220a-220n allow system 200 to communicate with other devices that may be wired and/or wireless. In some examples, one or more transceivers 220a-220n can include processors, controllers, radios, sockets, plugs, buffers, and like circuits/devices used for connecting to and communication on networks. According to some examples, one or more transceivers 220a-220n include one or more circuits to connect to and communicate on wired and/or wireless networks.

According to some aspects, one or more transceivers 220a-220n can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220a-220n can include more or fewer systems for communicating with other devices.

In some examples, one or more transceivers 220a-220n can include one or more circuits (including a WLAN transceiver) to enable connection(s) and communication over WLAN networks such as, but not limited to, networks based on standards described in IEEE 802.11. Additionally, or alternatively, one or more transceivers 220a-220n can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220n can include a Bluetooth™ transceiver.

Additionally, one or more transceivers 220a-220n can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), 5G, and the like. For example, one or more transceivers 220a-220n can be configured to operate according to one or more of 3GPP standards, as described in for example, 3GPP TS 38.331 3GPP 38.133, 3GPP 38.304, 3GPP 36.133, 3GPP 36.331.

Figure 4:
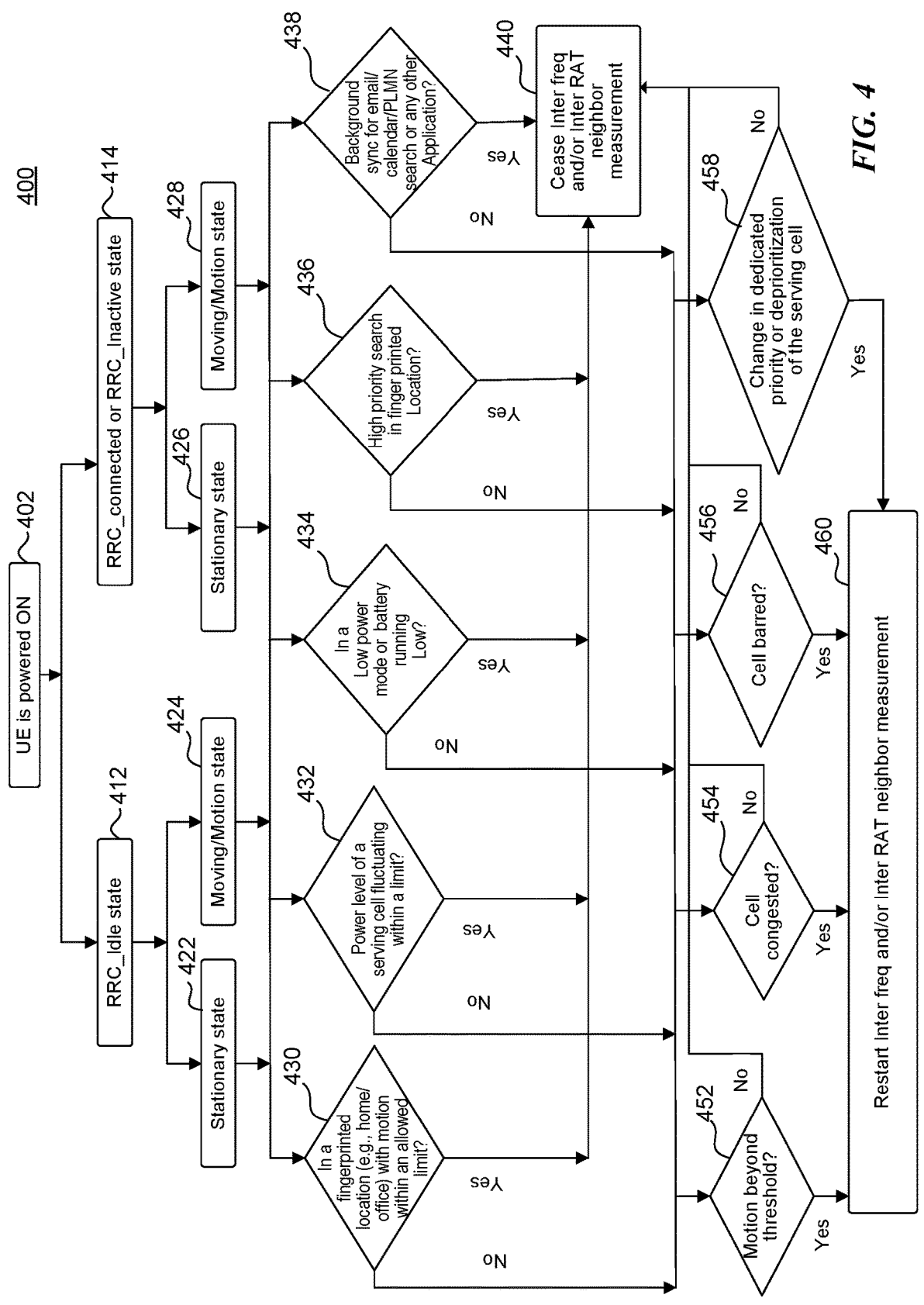
FIG. 4 illustrates an example method for a system (for example, a UE) for performing intelligent power saving operations, according to some aspects of the disclosure.

According to some aspects, processor 210, alone or in combination with computer instructions stored within memory 250, and/or one or more transceiver 220a-220n, implements operations for performing intelligent power saving operations at a wireless communication system, as further described herein in FIG. 3 and FIG. 4. Alternatively, the processor 209 can be "hard-coded" to perform these operations.

FIG. 3 illustrates an example method for a system (for example, a UE) for performing intelligent power saving operations, according to some aspects of the disclosure. Method 300 can be applicable to wireless systems, e.g., a wireless communication system based on one or more 3GPP standards, as described in for example, 3GPP TS 38.331 3GPP 38.133, 3GPP 38.304, 3GPP 36.133, 3GPP 36.331 or others. As a convenience and not a limitation, FIG. 3 may be described with regard to elements of FIGS. 1-2. Method 300 may represent the operation of an electronic device (for example, UE 105 of FIG. 1) implementing mechanisms for performing intelligent power saving operations at a wireless communication system. Method 300 may also be performed by system 200 of FIG. 2 and/or computer system 500 of FIG. 5. However, method 300 is not limited to the specific aspects depicted in those figures and other systems may be used to perform the method as will be understood by those skilled in the art. It is to be appreciated that not all operations may be needed, and the operations may not be performed in the same order as shown in FIG. 3.

At 302, whether a movement state associated with a UE satisfies one or more movement conditions is determined. In some aspects, the UE can be in a RRC_CONNECTED state, a RRC_IDLE state or a RRC_Inactive state. In some aspects, the movement state can include a movement state of at least substantially stationary. In some aspects, the movement state can include a movement state of moving below a predetermined speed, a predetermined distance, or a predetermined time period.

In some aspects, the movement state can be determined by movement information (e.g., speed, acceleration, etc.) of the UE using one or more positional and/or motion sensors (e.g., GPS, accelerometer, gyroscope sensor, etc.). In one example, the movement state can be determined as stationary for a specific period of time. The movement state can be determined as moving below a predetermined speed, a predetermined distance, or a predetermined time period. For example, the movement state can be determined as moving below a pedestrian or vehicular speed, a short distance, or a short time period.

In some aspects, the one or more movement conditions can include a movement state of at least substantially stationary, moving below a predetermined speed, a predetermined distance, and/or a predetermined time period.

At 304, operational information associated with the UE, in response to the determination that the movement state associated with the UE satisfies the one or more movement conditions, is determined. The operational information includes location information, power level information, or background process information.

In some aspects, the location information can be determined by location fingerprinting. Location fingerprinting can be associated with one or more positional determinations using signal characteristics relative to one or more base stations and/or access points.

The location information can be associated with a fingerprinted location associated with a user of the UE based on user information within an application, such as the "Maps" application. The fingerprinted location can include a location indicating home, office, and/or one or more other significant locations associated with the user.

In some aspects, the operational information associated with the UE can include movement information. In some aspects, movement information can be determined by a motion sensor.

In some aspects, movement information can include a motion of UE, for example, is within an allowed limit, such as moving below a predetermined speed, a predetermined distance, or a predetermined time period.

At 306, a signal measurement associated with a neighbor cell is ceased at least based on the operational information and one or more operational conditions being satisfied. In some aspects, the signal measurement associated with the neighbor cell can be associated with a cell reselection procedure, such as including 3GPP TS 38.331 3GPP 38.133, 3GPP 38.304, 3GPP 36.133, 3GPP 36.331 or others. In some aspects, the signal measurement can include an inter-frequency measurement or an inter-Radio Access Technology (inter-RAT) measurement.

In some aspects, the one or more operational conditions can include one or more conditions that the UE is in one of a plurality of predetermined locations, a power level of the UE is below a predetermined threshold, a location associated with the UE is one of a plurality of predetermined locations and a search for higher priority frequencies is determined, a background sync for an application or a background PLMN search is determined.

In some aspects, the signal measurement associated with the neighbor cell can be ceased when a location associated with the UE is one of a plurality of predetermined locations. In some aspects, the signal measurement associated with the neighbor cell can be ceased when a power level of the UE is below a predetermined threshold.

In some aspects, the signal measurement associated with the neighbor cell can be ceased when a location associated with the UE is one of a plurality of predetermined locations and a search for higher priority frequencies is determined.

In some aspects, the signal measurement associated with the neighbor cell can be ceased when a background sync for an application or a background PLMN search is determined.

In some aspects, performing the signal measurement associated with the neighbor cell can be restarted when the movement associated with the UE is above a predetermined threshold, including for example, moving for a hysteresis period, or hysteresis distance. In some aspects, performing the signal measurement associated with the neighbor cell can be restarted when the cell is determined to be congested. In some aspects, performing the signal measurement associated with the neighbor cell can be restarted when the cell is determined to be barred. In some aspects, performing the signal measurement associated with the neighbor cell can be restarted when a change in dedicated priority or deprioritization of cell is determined.

In some aspects, performing the signal measurement associated with the neighbor cell can be restarted when the power of the serving cell degrades below an acceptable threshold. In some aspects, performing the signal measurement associated with the neighbor cell can be restarted when priority information in received system information changes. In some aspects, performing the signal measurement associated with the neighbor cell can be restarted when the UE is paging for a voice call.

FIG. 4 illustrates an example method for a system (for example, a UE) for performing intelligent power saving operations, according to some aspects of the disclosure. Method 400 can be applicable to wireless systems, e.g., a wireless communication system based on one or more 3GPP standards, as described in for example, 3GPP TS 38.331 3GPP 38.133, 3GPP 38.304, 3GPP 36.133, 3GPP 36.331 or others. As a convenience and not a limitation, FIG. 4 may be described with regard to elements of FIGS. 1-3. Method 400 may represent the operation of an electronic device (for example, UE 105 of FIG. 1) implementing mechanisms for performing intelligent power saving operations at a wireless communication system. Method 400 may also be performed by system 200 of FIG. 2 and/or computer system 500 of FIG. 5. However, method 400 is not limited to the specific aspects depicted in those figures and other systems may be used to perform the method as will be understood by those skilled in the art. It is to be appreciated that not all operations may be needed, and the operations may not be performed in the same order as shown in FIG. 4.

At 402, a UE (e.g., UE 105) is determined to be powered on. At 412, UE 105 is determined to be in a RRC_Idle state. At 422, UE 105 is determined to be in a stationary state when UE 105 is in the RRC_Idle state. Alternatively, at 424, UE 105 is determined to be in a moving state when UE 105 is in the RRC_Idle state, such as a moving state satisfies one or more movement conditions.

Alternatively, at 414, UE 105 is determined to be in a RRC_CONNECTED state or a RRC_Inactive state. At 426, UE 105 is determined to be in a stationary state when UE 105 is in the RRC_CONNECTED state or the RRC_Inactive state. Alternatively, at 428, UE 105 is determined to be in a moving state when UE 105 is in the RRC_CONNECTED state or the RRC_Inactive state, such as a moving state satisfies one or more movement conditions.

In some aspects, UE 105 can be configured to determine whether a moving state satisfies one or more movement conditions. UE 105 can be configured to determine the moving state by examining movement information (e.g., speed, acceleration, etc.) of UE 105 using one or more positional and/or motion sensors (e.g., GPS, accelerometer, gyroscope sensor, etc.). UE 105 can be configured to determine the moving state satisfies one or more movement conditions, including: below a predetermined speed, movement below a predetermined distance, or stationary for a predetermined time period. In one example, UE 105 can be configured to determine UE 105 remains stationary for a specific period of time. In another example, UE 105 can be configured to determine the moving state is moving below a pedestrian or vehicular speed, a short distance, or a short time period.

At 430, UE 105 is configured to determine if UE 105 is in a fingerprinted location (e.g., home or office) with motion within an allowed limit. UE 105 can be configured to detect and/or store one or more significant locations associated with a user of UE 105 based on user information within an application, such as the Maps application. For example, UE 105 can be configured to detect and store one or more significant known locations such "home" and/or "work". In some aspects, when the user is registered in one of the significant locations, the user may stay there for a period of time. UE 105 can be configured to determine the fingerprinted location based on one or more positional determinations (e.g., location fingerprinting) using signal characteristics relative to one or more base stations and/or access points. UE 105 can be configured to determine the motion of UE 105 is within an allowed limit, such as moving below a predetermined speed, within a predetermined distance, or within a predetermined time period. In one example, UE 105 can be configured to determine UE 105 remains stationary for a specific period of time. In another example, UE 105 can be configured to determine the moving state is moving below a pedestrian or vehicular speed, a short distance, or a short time period.

If UE 105 is determined to be in a fingerprinted location (e.g., home or office) with motion within an allowed limit, the method 400 goes to 440. At 440, UE 105 is configured to cease one or more Inter freq and Inter RAT neighbor measurements.

In some aspects, UE 105 can be configured to fingerprint one or more cells at the fingerprinted location, and detect if the UE 105 experiences any mobility at the fingerprinted location. In some aspects, when the UE experiences mobility at the fingerprinted location, a deployed frequency associated with the UE at the fingerprinted location can be determined. UE 105 can be configured to form a table of deployed frequencies per location. In some aspects, if the UE is not stationary at the fingerprinted location, UE 105 can be configured to enable signal measurements only of the deployed frequencies.

If UE 105 is determined to not be in a fingerprinted location (e.g., home or office) with motion within an allowed limit, the method 400 goes to 452, 454, 456, and 458.

At 452, UE 105 is configured to determine if a motion of UE 105 is beyond a threshold, such as moving beyond a predetermined speed threshold, a predetermined distance threshold, or a predetermined time period threshold (e.g., a hysteresis period or hysteresis distance). If a motion of UE 105 is determined to be beyond a threshold at 452, the UE 105 is configured to restart or continue one or more Inter freq and Inter RAT neighbor measurements at 460. If a motion of UE 105 is determined not to be beyond a threshold at 452, the method 400 goes to 440.

At 454, UE 105 is configured to determine if a cell (e.g., serving cell) is congested. If the cell (e.g., serving cell) is determined to be congested, UE 105 is configured to restart or continue one or more Inter freq and Inter RAT neighbor measurements at 460. In some aspects, UE 105 can be configured to measure and determine the serving cell signal strength or signal quality matrix i.e. Reference Signal Received Power (RSRP), Reference Signal Received Quality (RSRQ) to be below a threshold. If the cell (e.g., serving cell) is determined not to be congested, the method 400 goes to 440.

At 456, UE 105 is configured to determine if a cell (e.g., serving cell) is barred. If the cell (e.g., serving cell) is determined to be barred, UE 105 is configured to restart or continue one or more Inter freq and Inter RAT neighbor measurements at 460. In some aspects, UE 105 can be configured to obtain cell barred information from system information broadcasted by the serving cell. If the cell (e.g., serving cell) is determined not to be barred, the method 400 goes to 440.

At 458, UE 105 is configured to determine if there is a change in dedicated priority or deprioritization of the serving cell. If there is a change in dedicated priority or deprioritization of the serving cell, UE 105 is configured to restart or continue one or more Inter freq and Inter RAT neighbor measurements at 460. In some aspects, UE 105 can be configured to determine a change in priority information by one or more changes in system information (e.g., SIBx). If there is no change in dedicated priority or deprioritization of the serving cell, the method 400 goes to 440.

As described in 3GPP TS 38.304, If UE is in camped on any cell state, UE shall only apply the priorities provided by system information from current cell, and the UE preserves priorities provided by dedicated signalling and deprioritisationReq received in RRCRelease unless specified otherwise. When the UE in camped normally state, has only dedicated priorities other than for the current frequency, the UE shall consider the current frequency to be the lowest priority frequency (i.e. lower than any of the network configured values).

At 432, UE 105 is configured to determine if a signal power level of a serving cell is fluctuating within a predefined limit. In some aspects, UE 105 can be configured to measure and determine the serving cell signal strength or signal quality matrix i.e. Reference Signal Received Power (RSRP), Reference Signal Received Quality (RSRQ) to be below a threshold. In some aspects, the limit can be a predetermined threshold. In some aspects, the limit can be one of a plurality of predetermined thresholds corresponding to a plurality of power ranges, respectively.

If the power level of a serving cell is fluctuating within a limit, the method 400 goes to 440. At 440, UE 105 is configured to cease one or more Inter freq and Inter RAT neighbor measurements.

If the power level of a serving cell is not fluctuating within a limit, the method 400 goes to 452, 454, 456, and 458.

At 434, UE 105 is configured to determine if UE 105 is in a low power mode or a battery is running low on UE 105.

If UE 105 is determined to be in a low power mode or a battery is running low on UE 105, the method 400 goes to 440. At 440, UE 105 is configured to cease one or more Inter freq and Inter RAT neighbor measurements.

If UE 105 is determined to be not in a low power mode or a battery is not running low on UE 105, the method 400 goes to 452, 454, 456, and 458.

At 436, UE 105 is configured to determine if there is a high priority search (e.g., a search for higher priority frequencies) in a fingerprinted location. In some aspects, UE 105 can be is configured to determine a high priority search based on cell selection and/or reselection parameters are broadcast in system information and are read from the serving cell. For example, as described in 3GPP TS 38.304, absolute priorities of different NR frequencies or inter-RAT frequencies may be provided to the UE in the system information, in the RRCRelease message, or by inheriting from another RAT at inter-RAT cell (re)selection. In the case of system information, an NR frequency or inter-RAT frequency may be listed without providing a priority (i.e. the field cellReselectionPriority is absent for that frequency). If any fields with cellReselectionPriority are provided in dedicated signaling, the UE shall ignore any fields with cellReselectionPriority and any slice reselection information provided in system information. If slice reselection information is provided in dedicated signaling, the UE shall ignore slice reselection information provided in system information.

If there is a high priority search in a fingerprinted location, the method 400 goes to 440. At 440, UE 105 is configured to cease one or more Inter freq and Inter RAT neighbor measurements.

If there is not a high priority search in a fingerprinted location, the method 400 goes to 452, 454, 456, and 458.

At 438, UE 105 is configured to determine if there is one of background sync for email application, calendar application or PLMN search or any other Application. In some aspects, a Background Sync Application Programming Interface (API) may allow authorized web applications (e.g., email application, calendar application) to not rely on having stable internet connection and defer network-related operations to the moment the connection is available. In some aspects, UE 105 may perform a background Public Land Mobile Network (PLMN) search for multiple reasons, for example, finding a high priority PLMN during roaming. If UE 105 is stationary, no new PLMNs may be found. UE 105 may allow a maximum of one background PLMN search. Alternatively, UE 105 may reduce the periodicity of the PLMN searches (e.g. skip every other search).

If there is one of background sync for email application, calendar application or PLMN search or any other application, the method 400 goes to 440. At 440, UE 105 is configured to cease one or more Inter freq and Inter RAT neighbor measurements.

If there no background sync for email application, calendar application or PLMN search or any other application, the method 400 goes to 452, 454, 456, and 458.

Figure 5:
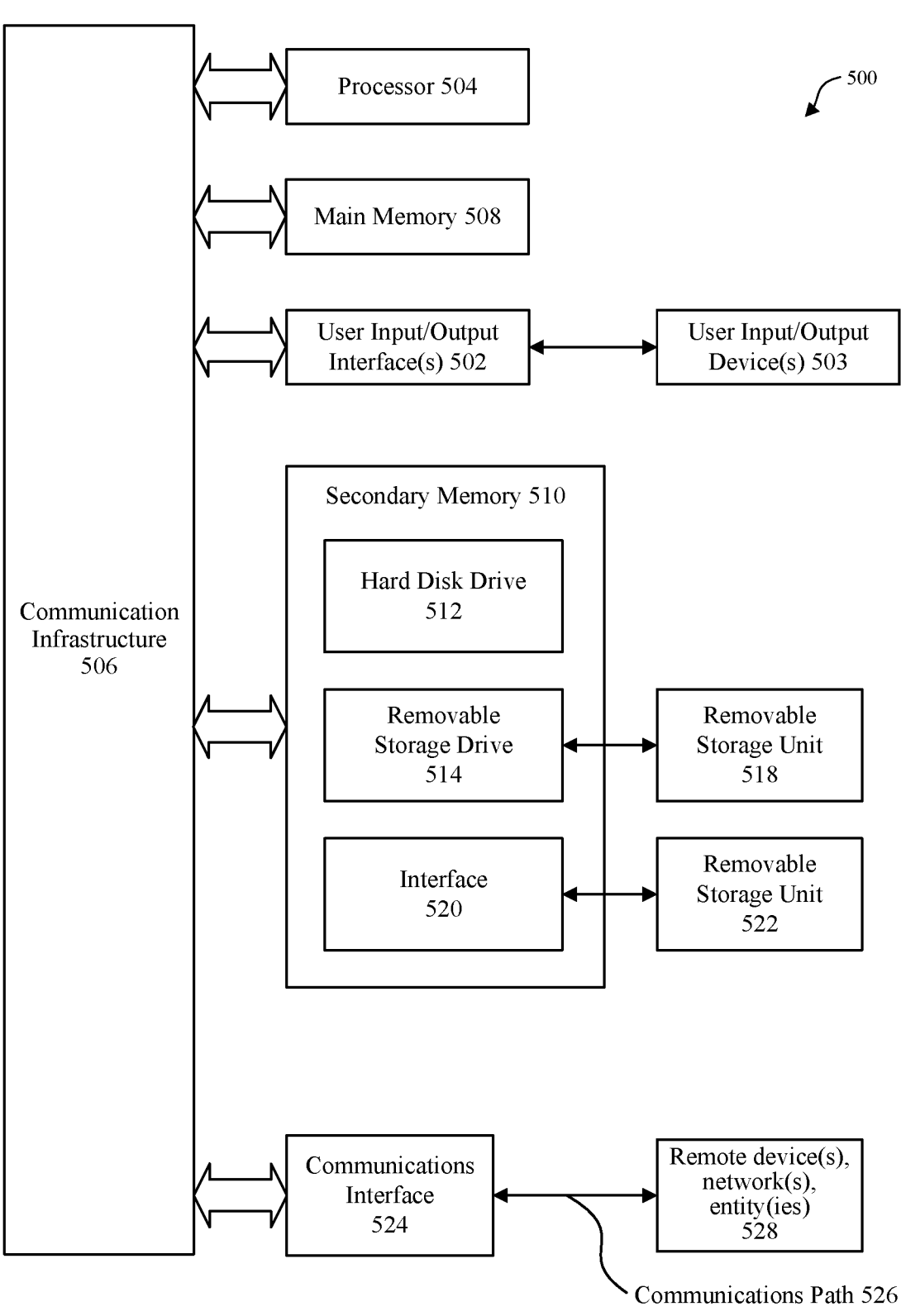
FIG. 5 is an example computer system for implementing some aspects or portion(s) thereof.

Various aspects can be implemented, for example, using one or more computer systems, such as computer system 500 shown in FIG. 5. Computer system 500 can be any well-known computer capable of performing the functions described herein such as devices 101, 105 of FIGS. 1 and/or 200 of FIG. 2. Computer system 500 includes one or more processors (also called central processing units, or CPUs), such as a processor 504. Processor 504 is connected to a communication infrastructure 506 (e.g., a bus.) Computer system 500 also includes user input/output device(s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

The operations in the preceding aspects can be implemented in a wide variety of configurations and architectures.

Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:

a transceiver configured to wirelessly communicate with a cell in a wireless network; and a processor communicatively coupled to the transceiver and configured to:

determine whether a movement state associated with the UE satisfies one or more movement conditions, wherein the one or more movement conditions comprise the movement state associated with the UE being at least substantially stationary;

determine operational information associated with the UE, in response to the determination that the movement state associated with the UE satisfies the one or more movement conditions, wherein the operational information includes location information or background process information; and cease, at least based on the operational information and one or more operational conditions being satisfied, a signal measurement associated with a neighbor cell, wherein the one or more operational conditions comprise the UE being in a location of a plurality of predetermined locations and the UE is searching for a higher priority frequency in the location.

2. The UE of claim 1, wherein the signal measurement comprises an inter-frequency measurement or an inter-Radio Access Technology (inter-RAT) measurement.

3. The UE of claim 1, wherein the location information is determined by location fingerprinting and the operational information associated with the UE comprises movement information.

4. The UE of claim 1, wherein the processor is further configured to:

restart or continue performing the signal measurement associated with the neighbor cell when the movement state associated with the UE is above a predetermined threshold; or restart or continue performing the signal measurement associated with the neighbor cell when the cell is determined to be congested; or restart or continue performing the signal measurement associated with the neighbor cell when the cell is determined to be barred; or restart or continue performing the signal measurement associated with the neighbor cell when a change in a dedicated priority or a deprioritization of the cell is determined.

5. The UE of claim 1, wherein the one or more operational conditions comprise a background Public Land Mobile Network (PLMN) search being determined.

6. A method, comprising:

determining whether a movement state associated with a user equipment (UE) satisfies one or more movement conditions, wherein the one or more movement conditions comprise the movement state associated with the UE being at least substantially stationary;

determining operational information associated with the UE, in response to the determination that the movement state associated with the UE satisfies the one or more movement conditions, wherein the operational information includes location information or background process information;

ceasing, at least based on the operational information and one or more operational conditions being satisfied, a signal measurement associated with a neighbor cell, wherein the one or more operational conditions comprise the UE being in a location of a plurality of predetermined locations and the UE is searching for a higher priority frequency in the location.

7. The method of claim 6, wherein the signal measurement comprises an inter-frequency measurement or an inter-Radio Access Technology (inter-RAT) measurement.

8. The method of claim 6, wherein the location information is determined by location fingerprinting and the operational information associated with the UE comprises movement information.

9. The method of claim 6, further comprising:

restarting or continuing performing the signal measurement associated with the neighbor cell when the movement state associated with the UE is above a predetermined threshold; or restarting or continuing performing the signal measurement associated with the neighbor cell when a cell is determined to be congested; or restarting or continuing performing the signal measurement associated with the neighbor cell when the cell is determined to be barred; or restarting or continuing performing the signal measurement associated with the neighbor cell when a change in a dedicated priority or a deprioritization of the cell is determined.

10. The method of claim 6, wherein the one or more operational conditions comprise a background Public Land Mobile Network (PLMN) search being determined.

11. A non-transitory computer-readable medium storing instructions, wherein the instructions, when executed by a processor of a user equipment (UE), cause the UE to perform operations comprising:

determining whether a movement state associated with the UE satisfies one or more movement conditions, wherein the one or more movement conditions comprise the movement state associated with the UE being at least substantially stationary;

determining operational information associated with the UE, in response to the determination that the movement state associated with the UE satisfies the one or more movement conditions, wherein the operational information includes location information or background process information;

ceasing, at least based on the operational information and one or more operational conditions being satisfied, a signal measurement associated with a neighbor cell, wherein the one or more operational conditions comprise the UE being in a location of a plurality of predetermined locations and the UE is searching for a higher priority frequency in the location.

12. The non-transitory computer-readable medium of claim 11, wherein the signal measurement comprises an inter-frequency measurement or an inter-Radio Access Technology (inter-RAT) measurement.

13. The non-transitory computer-readable medium of claim 11, wherein the location information is determined by location fingerprinting and the operational information associated with the UE comprises movement information.

14. The non-transitory computer-readable medium of claim 11, wherein the one or more operational conditions comprise a background Public Land Mobile Network (PLMN) search being determined.

* * * * *